United States Patent [19]

Enikolopov et al.

[11] Patent Number: 4,607,796

[45] Date of Patent: Aug. 26, 1986

[54] METHOD OF MAKING POWDER FROM RUBBER AND VULCANIZATION PRODUCTS

[75] Inventors: Nikolai S. Enikolopov; Anatoly I. Nepomnyaschy; Lidia A. Filmakova, all of Moscow; Valentin P. Krasnokutsky, Zagorsk; Leonid I. Kurakin, Moscow; Elena L. Akopian, Moscow; Khristofor A. Markarian, Moscow; Saibdzhan S. Negmatov, Tashkent; Suleiman K. Matkarimov, Osh; Yury A. Polivanov, Moscow; Pavel P. Sherstnev, Moscow; Vilitary B. Pavlov, Moscow, all of U.S.S.R.

[73] Assignee: Nauchno-Proizvodstvennoe Obiedinenie "Norplast", Moscow, U.S.S.R.

[21] Appl. No.: 676,550

[22] Filed: Nov. 30, 1984

[51] Int. Cl.$^4$ .............................................. B02C 19/12
[52] U.S. Cl. ........................................ 241/3; 241/23; 241/25; 241/29; 241/DIG. 31
[58] Field of Search ................. 425/379 R; 241/3, 23, 241/25, 29, 30, 260.1, DIG. 31

[56] References Cited

U.S. PATENT DOCUMENTS

| | | | |
|---|---|---|---|
| 3,190,565 | 6/1965 | Jayne | 241/22 |
| 3,887,319 | 6/1975 | Cottingham | 425/379 R |
| 4,183,448 | 1/1980 | Nash | 425/379 R |

FOREIGN PATENT DOCUMENTS 1424768  2/1976  United Kingdom .

OTHER PUBLICATIONS

T. Nazy, "Chemical Technology", Mar. 1976.
N. A. Rogov, "Production of Regenerate", 1957.

Primary Examiner—Mark Rosenbaum
Assistant Examiner—Timothy V. Eley
Attorney, Agent, or Firm—Burgess, Ryan & Wayne

[57] ABSTRACT

There is provided a method wherein the source material, rubber or vulcanization products is pulverized in an extruder wherein it is first compressed by a force of 0.2 to 0.7 MPa, then subjected simultaneously to a pressure ranging from 0.2 to 50 MPa and a shear force ranging from 0.03 to 5 N/mm$^2$ while heating the material to a temperature ranging from 80° to 250° C. and then cooling said material to a temperature ranging from 15° to 60° C. The source materials can be used rubber goods, such as used tires and rejects of tire industry, footwear and industrial rubber production.

8 Claims, No Drawings

METHOD OF MAKING POWDER FROM RUBBER AND VULCANIZATION PRODUCTS

FIELD OF THE INVENTION

The present invention relates to reclaiming waste rubber and vulcanization products and is more specifically concerned with methods of making powders from rubber and rubber vulcanization products.

Increasing production of industrial rubber goods, tires and footwear has resulted in the accumulation of large quantities of rubber wastes, including rubber fins and rind and rejects, which find no practical application. In addition, used tires and mechanicals have fewer uses and pile up occupying large areas of land for storage and pollute the environment. The problem of reclaiming such materials into some product which can be put to use is one of the high priority problems in the field.

Waste rubber, old tires and industrial rubber products can be reutilized provided they are processed into a finely dispersed powder.

It is known that used rubber, even if it contains cordage fibre, can be comminuted and added in an amount of 20 to 30 weight percent to rubber mixes instead of rubber for many applications. The use of the comminuted rubber whose particles size does not exceed 500 micrometers does not impair the product quality, on the contrary, some properties, such as resistance to abrasion and crack growth, are even improved. Unfortunately, fine powders can be obtained from rubbers only at the expense of large amounts of energy.

Known in the art is a method of making finely dispersed powders from used rubbers by cryogenic destruction (cf., for example. Chemical Technology, Cryopulverizing, T. Nazy, R. Davis, 1976, 6, No. 3, pp.200-203). This method comprises cooling the feed material to very low temperatures by liquid nitrogen or solid carbon dioxide and then subjecting them to impact or cutting. This method produces finely dispersed powders having particle dimensions less than 500 micrometers but is expensive since a large plant for liquid nitrogen production must be included in the technological process. One kilogram of finished product requires 5 kg of nitrogen, while powder demands are about 1,500 kWh/t.

Also known in the art is a method of pulverizing materials which are elastic, sticky and tend to agglomerate, including sheet rubber, by comminution in mills featuring knife blades in the presence of antiagglomerating agents which inhibit sticking of the comminuted material to the cutting blades (cf., for example, U.S. Pat. No. 3,190,565). Antiagglomerating agents can be either a polyethylene powder or a polypropylene powder whose particles are capable of passing through standard sieves of at least 40 mesh and, preferably, from 100 to 200 mesh. This method, however, is not suitable for producing a finely dispersed powder. It is used to make coarse, from 0.6 to 0.9 cm, rubber crumbs.

Known in the art is a method of grinding industrial rubbers by passing them through a system of crushing and milling rollers using the shear force. The finished product particles are in excess of 1,000 micrometers (cf., for example, N. A. Rogov, Reclaiming Rubber, Moscow, 1957, pp.57-62, in Russian).

This method permits production of a more finely divided powder but is still cost-intensive since it requires an assortment of machines and equipment. Moreover, the method is not suitable to produce powders of natural and synthetic rubbers.

Also known in the art is a method of making powders from industrial rubbers by mechanical comminution including shear forces (cf., for example, British Pat. No. 1,424,768). This method uses a plunger-type device equipped with a rotating member installed inside the device and having an oval cross-sectional shape. The material is crushed in the minimal gap between the rotating member and the inside wall of the device.

This method is deficient in that the process is not continuous and temperature control is not possible during crushing. In consequence, the material is heated, subjected to destruction and the powder tends to agglomerate.

Moreover, when this method is used for comminuting rubber-and-canvas materials or tires, the fibre is only comminuted to about 50 mm long particles, while the rubber is pulverized to particles of about 200 micrometers. In other words, the powder produced by this method is not uniform and the fibre and rubber must be separated if the powder is to be used in rubber mixes.

OBJECT OF THE INVENTION

It is an object of the present invention to provide a method for making a powder from rubber or vulcanization products, which is capable of producing a more finely dispersed powder and consume less power as contrasted to the prior art methods.

SUMMARY OF THE INVENTION

There is provided a method for making a powder from rubber and rubber vulcanization products by applying a shearing force to the initial material, in which, according to the invention, the material is compressed by a force ranging from 0.2 to 0.7 MPa and the compressed material is pulverized by simultaneously applying a pressure ranging from 0.2 to 50 MPa and a shear force ranging from 0.03 to 5 N/mm$^2$, to the material at a temperature in the range of 80°-250° C. and then cooling the material to a temperature in the range of 15°-60° C. under the pressure and shear conditions.

The heating-cooling cycle can be done twice depending on the origin and properties, both physical and mechanical, of the pulverized material. This repetition helps to improve the degree of comminution of the powder dispersion.

Depending on the source material the pulverization process is done in the presence of a polyethylene additive. This additive also helps improve the degree of comminution of the powder dispersion.

The pulverization process is a continuous process performed in a single- or multiple-screw extruder.

The method according to the invention permits production of a finely comminuted dispersed powder from rubber or rubber vulcanization products, wherein the particles size does not exceed 500 micrometers in the former case and 300 micrometers in the latter case.

The present invention utilizes waste products, such as used tires, rejects of the tire industry, rubber footwear production and industrial rubber goods manufacturing, by pulverizing such materials into a finely comminuted dispersed powder which can be used as a filler for rubber mixes.

These and other advantages will become apparent from the following detailed description of the invention.

DETAILED DESCRIPTION OF THE INVENTION

The process is performed in a single-screw or multiple-screw extruder having at least two temperature zones, each capable of either heating or cooling depending on the procedure. Coarsely cut pieces of rubber measuring up to 100×50×30 mm are fed into said extruder. At first the material is compressed by a force ranging from 0.2 to 0.7 MPa. The compressed material is comminuted by simultaneously applying a pressure of from 0.2 to 50 MPa and a shear force ranging from 0.03 to 5 N/mm$^2$, while first heating the material to a temperature from 80° to 250° C. and subsequently cooling it to a temperature from 15° to 60° C. Under such conditions the material is pulverized to a finely comminuted dispersed powder.

The source material can be natural rubber, synthetic rubber or rubber vulcanization products, such as waste materials and rejects (trimmings and spoilage). The powder produced from these materials can be used as a filler for rubber mixes.

In order to obtain a finely dispersed powder from butyl rubbers, use of a granulated polyethylene additive is preferred. It is added directly to the source material in an amount of from 0.5 to 20 weight percent. In this pulverization method, the polyethylene additive is the synergistic component, while in the known method (U.S. Pat. No. 3,190,565) the polyethylene powder is used to dust the rubber powder particles and acts as an antiagglomeration agent.

The method according to the invention requires no special equipment and can be realized with the help of a single- or multiple-screw extruder. The final product is a powder with a particle size not exceeding 500 micrometers with the natural rubber source material and 300 micrometers with other rubbers as source materials. This particle size can be achieved if all technological parameters of the process are strictly observed. Particles can become larger if the initial compression and the subsequent pressure and shear force are insufficient and do not reach the lower limits indicated above. Exceeding the upper limits of the forces applied does not gain any additional effect, it only wastes power and makes the method less efficient. Also important are the temperature ranges. Any deviation from the prescribed limits is definitely detrimental to the quality of the powder produced. If the temperature goes beyond 250° C., it can result in destruction of the polymer and impair the quality of products where this powder is to be used as a filler. After heating the material is cooled to the range of 15° to 60° C. This range can be explained as follows. Temperatures in excess of 60° C. can lead to plastification of particles and their subsequent agglomeration, while cooling the powder below 15° C. can only result in additional power consumption.

The method according to the invention is a continuous process carried out in one piece of equipment and is easily adaptable to industrial applications.

One advantage of the method according to the invention is that the power consumption is relatively low. Thus, for example, only 200–400 kWh is required to produce one ton of the powder, which is substantially less than the cost of cryopulverization where the respective figure is 1,500 kWh/t.

One advantage of the method according to the invention is that it is capable of producing a finely dispersed powder from used industrial rubber goods and rejects of the rubber industry. The powder obtained from these products can be used in rubber mixes. The present invention, therefore, successfully deals with the problem of utilization of used tires and other rubber goods, rejects of the tire industry, rubber footwear industry and other industrial rubber goods manufacturing processes where rubber or its vulcanization products are used. The invention contributes, therefore, to controlling the pollution of the environment.

Since the method according to the invention processes rubber wastes to make a rubber powder which is used as a filler for rubber mixes, the process can be regarded as contributing to solving the problem of waste-free production of industrial rubber goods.

For better understanding the invention, the following examples are given to illustrate the method.

EXAMPLE 1

Waste rubber is loaded into a double-screw extruder which has two temperature zones. The source material is polyisoprene rubber cut into pieces about 100×50×30 mm in size. In the extruder the material is compressed by a force of 0.3 MPa and then subjected simultaneously to a pressure of 25 MPa and a shear force of 2.5 N/mm$^2$ at a temperature of 160° C. in the first zone and 30° C. in the second zone.

The powder thus produced has the following weight percent composition: 30% of particles less than 50 micrometers, 50% of particles whose size ranges from 50 to 100 micrometers, and 20% of particles ranging from 100 to 200 micrometers.

EXAMPLE 2

The process is performed as in Example 1, but the source material is a natural rubber vulcanizate which consists of rejects from the rubber industry.

The powder has the following disperse weight percent composition: 27% of particles less than 50 micrometers, 45% of particles ranging from 50 to 100 micrometers, and 28% of particles ranging from 100 to 250 micrometers.

EXAMPLE 3

The process is performed as in Example 1, but the source material is butadiene-styrene rubber comprising rejects of industrial rubber industry.

The powder has the following weight percent composition: 23% of particles less than 50 micrometers, 54% of particles ranging from 50 to 100 micrometers, and 23% of particles ranging from 100 to 200 micrometers.

EXAMPLE 4

Waste rubber based on polychloroprene rubber cut into 100×50×30 mm pieces is fed into the double-screw extruder of Example 1. The source material is compressed in the extruder by a force of 0.4 MPa and then subjected simultaneously to a pressure of 15 MPa and a shear force of 5 N/mm$^2$ at a temperature of 210° C. in the first zone and 30° C. in the second zone.

The powder thus produced has the following weight percent composition: 20% of particles less than 50 micrometers, 26% of particles ranging from 50 to 100 micrometers, and 45% of particles from 100 to 250 micrometers in size.

EXAMPLE 5

The process is performed as in Example 1, but the source material is a mixture of natural rubber, butadiene-styrene rubber and polychloroprene rubber taken in random proportions.

The powder thus obtained has the following weight percent composition: 20% of particles less than 50 micrometers, 70% of particles ranging from 50 to 100 micrometers, and 10% of particles ranging from 100 to 250 micrometers.

EXAMPLE 6

Waste rubber is loaded into a double-screw extruder as in Example 1. The source material is nitrile rubber cut into 100 by 50 by 30 mm pieces. In the extruder the material is compressed by a force of 0.3 MPa. Then it is simultaneously subjected to a pressure of 1.5 MPa and a shear force of 0.03 N/mm$^2$ at a temperature of 180° C. in the first zone and 40° C. in the second zone.

The powder thus produced has the following weight percent composition: 4% of particles less than 50 micrometers, 17% of particles ranging from 50 to 100 micrometers, and 79% of particles ranging from 100 to 300 micrometers.

EXAMPLE 7

Waste rubber is loaded into a single-screw extruder having four temperature zones. The source material is divinylstyrene rubber cut into 100 by 50 by 30 mm pieces. In the extruder the material is compressed by a force of 0.7 MPa and then subjected simultaneously to a pressure of 25 MPa and a shear force of 3.2 N/mm$^2$ at a temperature of 180° C. in the first zone, 60° C. in the second zone, 120° C. in the third zone, and 15° C. in the fourth zone.

The powder thus obtained has the following weight percent composition: 24% of particles less than 50 micrometers, 14% of particles ranging from 50 to 100 micrometers, and 62% of particles ranging from 100 to 300 micrometers.

EXAMPLE 8

Rubber-and-canvas material containing 15 weight percent of fibre is loaded into the double-screw extruder of Example 1. In the extruder the material is compressed to 0.5 MPa and subjected simultaneously to a pressure of 30 MPa and a shear force of 2.5 N/mm$^2$ at a temperature of 80° C. in the first zone and 20° C. in the second zone.

The powder obtained in this manner has the following weight percent composition: 20% of rubber particles and 10% of fibre particles less than 50 micrometers, 30% of rubber particles and 50% of fibre particles ranging from 50 to 100 micrometers, 50% of rubber particles and 40% of fibre particles ranging from 100 to 200 micrometers.

EXAMPLE 9

Pieces of butyl rubber not larger than 100 by 50 by 30 mm and polyethylene in the amount of 0.5 weight percent are loaded into the double-screw extruder described in Example 1. In the extruder the material is compressed to 0.5 MPa and then simultaneously subjected to a pressure of 5 MPa and a shear force of 1 N/mm$^2$ at a temperature of 150° C. in the first zone and 40° C. in the second zone.

The rubber powder thus obtained has the following weight percent composition: 5% of particles less than 50 micrometers, 15% of particles ranging from 50 to 100 micrometers, 18% of particles ranging from 100 to 200 micrometers, 20% of particles ranging from 200 to 300 micrometers, and 42% of particles ranging from 300 to 500 micrometers.

EXAMPLE 10

Pieces of rubber based on styrene-acrylonitrile copolymer (74:26 weight percent) and 20 weight percent of polyethylene are loaded into the double-screw extruder of Example 1. In the extruder the material is compressed to 0.3 MPa, and then subjected simultaneously to a pressure of 10 MPa and a shear force of 1.3 N/mm$^2$ at a temperature of 120° C. in the first zone and 30° C. in the second zone.

The powder thus obtained has the following weight percent composition: 15% of particles ranging from 50 to 100 micrometers, 25% of particles ranging from 100 to 200 micrometers, 25% of particles ranging from 200 to 300 micrometers, 35% of particles ranging from 300 to 500 micrometers.

EXAMPLE 11

Pieces of waste rubber based on butyl rubber having the size of less than 100 by 50 by 30 mm and 10 weight percent of polyethylene are loaded into the double-screw extruder of Example 1. In the extruder the material is compressed to 0.7 MPa, and then simultaneously subjected to a pressure of 3.5 MPa and a shear force of 1.5 N/mm$^2$ at a temperature of 160° C. in the first zone and 30° C. in thesecond zone.

The rubber powder thus obtained has the following weight percent composition: 6% of particles less than 50 micrometers, 10% of particles ranging from 50 to 100 micrometers, 13% of particles ranging from 100 to 200 micrometers, 36% of particles ranging from 200 to 300 micrometers, and 35% of particles ranging from 300 to 500 micrometers.

What is claimed is:

1. A method of making a powder from a source material comprising rubber, rubber vulcanizates and mixtures thereof which comprises compressing the material at a pressure of 0.2 to 0.7 MPa, subjecting the compressed material to a shearing force of from 0.03 to 5 N/mm$^2$ at a pressure of from 0.2 to 50 MPa at a first temperature of from 80° to 250° C. to form a hot-sheared material and subjecting the hot-sheared material to a shearing force of from 0.03 to 5 N/mm$^2$ at a pressure of from 0.2 to 50 MPa at a second temperature of from about 15° to 60° C. to form a cooled powder material.

2. The method of claim 1 which further comprises subjecting the cooled powder material to a shearing force of from 0.03 to 5 N/mm$^2$ at a pressure of from 0.2 to 50 MPa at a third temperature of from 80° to 250° C. to form a second hot sheared material and subjecting said second hot sheared material to a shearing force of from 0.03 to 5 N/mm$^2$ at a pressure of from 0.2 to 50 MPa at a fourth temperature of from 15° to 60° C. to form a cooled powder material.

3. The method of claim 1 wherein from 0.5 to 20 percent by weight of polyethylene is mixed with the source material.

4. The method of claim 1 wherein the process is carried out in a single screw extruder.

5. The method of claim 1 wherein the process is carried out in a multiple screw extruder.

6. The method of claim 2 wherein from 0.5 to 20 percent by weight of polyethylene is mixed with the source material.

7. The method of claim 2 wherein the process is carried out in a single screw extruder.

8. The method of claim 2 wherein the process is carried out in a multiple screw extruder.

* * * * *